US008695875B1

(12) United States Patent
Segura

(10) Patent No.: US 8,695,875 B1
(45) Date of Patent: Apr. 15, 2014

(54) METHODS OF AND SYSTEMS FOR AUTOMATIC CREDIT CARD REWARDS

(75) Inventor: Michele Lea Segura, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/466,419

(22) Filed: Aug. 22, 2006

(51) Int. Cl.
*G06K 5/00* (2006.01)

(52) U.S. Cl.
USPC ............................ 235/380; 235/383; 235/385

(58) Field of Classification Search
USPC ............................... 235/380, 383; 705/14, 39
See application file for complete search history.

(56) References Cited

U.S. PATENT DOCUMENTS

| | | | |
|---|---|---|---|
| 5,689,100 A * | 11/1997 | Carrithers et al. ............ | 235/380 |
| 6,112,191 A | 8/2000 | Burke | |
| 6,138,911 A | 10/2000 | Fredregill et al. | |
| 6,516,302 B1 | 2/2003 | Deaton et al. | |
| 7,090,138 B2 | 8/2006 | Rettenmyer et al. | |
| 7,092,905 B2 * | 8/2006 | Behrenbrinker et al. ....... | 705/39 |
| 7,392,222 B1 * | 6/2008 | Hamilton et al. ............... | 705/39 |
| 7,398,226 B2 * | 7/2008 | Haines et al. .................. | 705/14 |
| 2003/0061097 A1 | 3/2003 | Walker et al. | |
| 2003/0236704 A1 | 12/2003 | Antonucci | |
| 2004/0093271 A1 | 5/2004 | Walker et al. | |
| 2005/0149394 A1 | 7/2005 | Postrel | |
| 2005/0192862 A1 | 9/2005 | Modi | |
| 2005/0240477 A1 | 10/2005 | Friday et al. | |
| 2005/0251446 A1 * | 11/2005 | Jiang et al. ....................... | 705/14 |
| 2006/0059040 A1 * | 3/2006 | Eldred et al. .................... | 705/14 |
| 2006/0224449 A1 * | 10/2006 | Byerley et al. .................. | 705/14 |
| 2006/0253321 A1 | 11/2006 | Heywood | |
| 2006/0289631 A1 | 12/2006 | Stretch et al. | |
| 2007/0000997 A1 * | 1/2007 | Lambert et al. ............... | 235/380 |
| 2009/0313106 A1 * | 12/2009 | Taylor et al. ............... | 705/14.25 |
| 2011/0010238 A1 * | 1/2011 | Postrel ........................ | 705/14.38 |

OTHER PUBLICATIONS

Marketing material on Rewards American Express® Card from Bank of America®.
Marketing material on Fidelity Investment Rewards Visa® credit card.
"Student Credit Center—Discover Card", http://www.discovercard.com/discover/data/student/, (Aug. 22, 2006), 2 p.
"Student Credit Card—Discover Student Card", http://www.discovercard.com/apply/student/, (Aug. 22, 2006), 1 p.
"Discover Card: Cashback Bonus", http://www.discovercard.com/discover/data/cashback/, (Aug. 22, 2006), 2 p.
"MBNA.com Cash Back Credit Cards", http://www.mbna.com/creditcards/cash_back.html, (Aug. 22, 2006), 2 p.

(Continued)

*Primary Examiner* — Sonji Johnson
(74) *Attorney, Agent, or Firm* — Brooks, Cameron & Huebsch, PLLC

(57) ABSTRACT

Systems and methods for substantially immediate reward benefits. Reward benefits are provided without delay, for example, in credit card purchases by a cardholder. More specifically, a reward point value is converted to a credit amount and the credit amount is automatically and immediately applied to the cardholder's account.

18 Claims, 2 Drawing Sheets

(56) References Cited

OTHER PUBLICATIONS

"MBNA.com—All-Purpose Rewards", http://www.mbna.com/creditcards/all_purpose.html (Aug. 22, 2006), 2 p.

"MBNA.com—Shopping Rewards Credit Cards", http://www.mbna.com/creditcards/shopping.html, (Aug. 22, 2006), 4 p.

"MBNA.com—Hotel, Cruise, and Other Travel Rewards Credit Cards", http://www.mbna.com/creditcards/travel.html, (Aug. 22, 2006), 5 p.

"MBNA.com—Outdoors & Recreational Credit Cards", http://www.mbna.com/creditcards/outdoor.html, (Aug. 22, 2006), 3 p.

"Exxon Preferred Card Benefits", http://www.exxon.com/USA-English/GFM/How_to_Buy/XOMPreffered_Benefits.asp, (Aug. 22, 2006), 1 p.

"ExxonMobile MasterCard Benefits", http://www.getgasrebates.com/exx_ben.htm, (Aug. 22, 2006), 2 p.

* cited by examiner

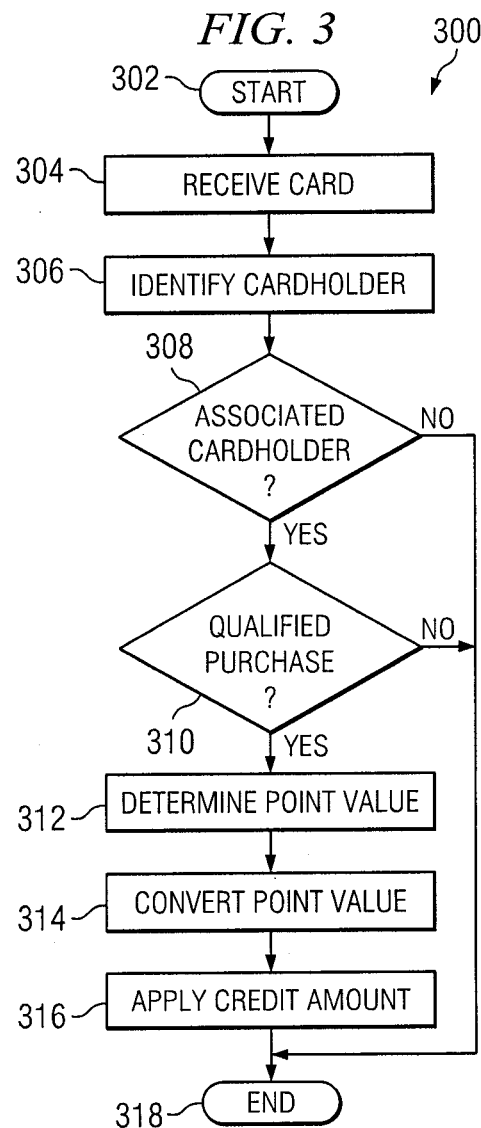

METHODS OF AND SYSTEMS FOR AUTOMATIC CREDIT CARD REWARDS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS

This application is related in subject matter to, and incorporates by reference herein in its entirety, each of the following:

U.S. patent application Ser. No. 11/466,396, filed Aug. 22, 2006;
U.S. patent application Ser. No. 11/466,409, filed Aug. 22, 2006;
U.S. patent application Ser. No. 11/466,428, filed Aug. 22, 2006;
U.S. patent application Ser. No. 11/466,424, filed Aug. 22, 2006;
U.S. patent application Ser. No. 11/466,430, filed Aug. 22, 2006;
U.S. patent application Ser. No. 11/466,437, filed Aug. 22, 2006;
U.S. patent application Ser. No. 11/466,440, filed Aug. 22, 2006;
U.S. patent application Ser. No. 11/466,444, filed Aug. 22, 2006;
U.S. patent application Ser. No. 11/466,450, filed Aug. 22, 2006;
U.S. patent application Ser. No. 11/459,907, filed Jul. 25, 2006;
U.S. patent application Ser. No. 11/459,911, filed Jul. 25, 2006;
U.S. patent application Ser. No. 11/459,916, filed Jul. 25, 2006
U.S. Patent Application No. 60/830,942, filed on Jul. 13, 2006; U.S. patent application Ser. No. 11/639,693, filed on Dec. 15, 2006; U.S. patent application Ser. No. 11/639,568, filed on Dec. 15, 2006; U.S. patent application Ser. No. 11/639,534, filed on Dec. 15, 2006; and U.S. patent application Ser. No. 11/639,520, filed on Dec. 15, 2006;

TECHNICAL FIELD

Disclosed embodiments relate generally, by way of example and not limitation, to systems and methods that enable a financial services business entity to provide a rewards benefit to an account holder who makes a purchase from a merchant or vendor who is also affiliated with the financial services entity.

BACKGROUND

Business entities that provide financial services often offer various reward programs for account holders who make purchases from a merchant or vendor who is affiliated with the business entity. For example, the DISCOVER® Financial Services group of companies offers cashback bonus programs to DISCOVER® Card account holders who make purchases using a DISCOVER® Card credit card.

The DISCOVER® Financial Services group of companies also offers other DISCOVER® Card credit card programs. In addition to offering 5% or 1% cashback bonuses, one DISCOVER® Card credit card program also promises account holders "Unlimited cash rewards that never expire" and "Double your Cashback Bonus when you redeem for gift cards or certificates from many of our 60 brand-name Partners." The availability of these or other additional features in the DISCOVERS Card credit card program may represent an advantage that motivates an account holder to prefer (and show loyalty to) a DISCOVER® Card credit card over a competitor's credit card.

SUMMARY

This summary is not intended to represent each embodiment or every aspect; the following paragraphs of this summary provide representations of some embodiments or aspects thereof.

A method for applying a credit amount to a cardholder's account includes receiving a card from a cardholder for a purchase from a merchant, sending a card number associated with the card to a cardholder's bank server, and identifying, by the cardholder's bank server, the cardholder as being associated with a financial services company. The method further includes determining, by the cardholder's bank server, a reward point value available from the financial services company for the purchase; converting, by the cardholder's bank server, the reward point value to a credit amount; and automatically applying the credit amount to the cardholder's account for substantially immediate use by the cardholder.

A system for applying a credit amount to a cardholder's account includes a merchant terminal adapted to receive a card from a cardholder for a purchase from a merchant; and a cardholder's bank server in communication with the merchant terminal. The cardholder's bank server is adapted to: receive a card number associated with the card from the merchant terminal; identify the cardholder as being associated with a financial services company; determine a reward point value available from the financial services company for the purchase; convert the reward point value to a credit amount; and automatically apply the credit amount to the cardholder's account for substantially immediate use by the cardholder.

An article of manufacture for applying a credit amount to a cardholder's account including at least one computer readable medium; and processor instructions contained on the at least one computer readable medium. The processor instructions are configured to be readable from the at least one computer readable medium by at least one processor and thereby cause the at least one processor to operate as to: receive a card number associated with a card from a merchant terminal, wherein the card is received at the merchant terminal from a cardholder for a purchase from a merchant; identify the cardholder as being associated with a financial services company; determine a reward point value available from the financial services company for the purchase; convert the reward point value to a credit amount; and automatically apply the credit amount to the cardholder's account for substantially immediate use by the cardholder.

BRIEF DESCRIPTION OF THE DRAWINGS

A more complete understanding of the disclosed methods and systems may be obtained by reference to the following Detailed Description, when taken in conjunction with the accompanying Drawings, wherein:

FIG. 3 is a flow diagram illustrating a process for automatically converting reward points to credits to an account for substantially immediate use.

DETAILED DESCRIPTION

The present methods and systems will now be described more fully with reference to the accompanying drawings in which various embodiment(s) are shown. The methods and systems may, however, be embodied in many different forms and should not be constructed as limited to the embodiments set forth herein; rather, these embodiments are provided so that this disclosure will be thorough and complete, and will fully convey the scope of the systems and methods to those skilled in the art.

Figure 1:
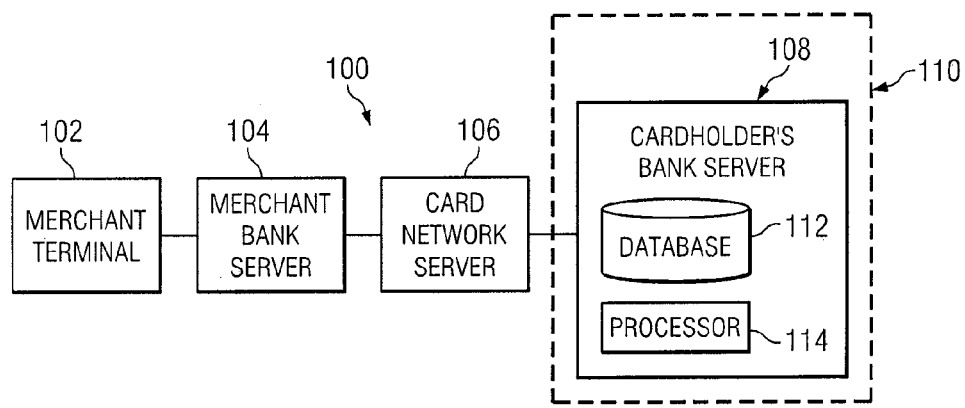
FIG. 1 illustrates a system that may be used to automatically convert reward points to credits to an account for substantially immediate use.

Referring now to FIG. 1, a system 100 for automatically converting reward points to credits to an account for substantially immediate use is illustrated. The system 100 includes a merchant terminal 102 connected to a merchant bank server 104. The merchant bank server 104 is further connected to a card network server 106. The card network server 106 is connected to a cardholder's bank server 108. The cardholder's bank is one of the businesses of a financial services company 110 that may include a number of other businesses such as, for example, automobile insurance, homeowners insurance, household and other consumer product sales, life insurance, mortgage, automobile loan, investment, checking, and the like. The cardholder's bank server 108 includes a database 112 for holding cardholder account information and a processor 114 for executing software instructions for carrying out processes of various embodiments described herein.

During an exemplary transaction in which a cardholder wishes to make a purchase of a one or more products or services from a merchant, the cardholder swipes a credit card at the merchant terminal 102. In accordance with some embodiments, the merchant is an affiliated merchant of the financial services company 110. The merchant terminal 102 then sends information identifying the cardholder in the form of a credit card number to the merchant bank server 104. The merchant bank server 104 then sends a query to the card network server 106 to identify the cardholder's bank. The card network server 106 determines the cardholder's bank using, for example, all or a portion of the credit card number associated with the cardholder.

After determining the cardholder's bank, the card network server 106 sends a request for approval of the purchase to the cardholder's bank server 108. The cardholder's bank server 108 verifies that the cardholder is associated with the financial services company 110 and determines if the purchase qualifies for reward points.

Criteria for determining whether a purchase qualifies for reward points may include, but are not limited to, the identity of the product or service purchased, a purchase price of the product or service, the identity of the merchant, and the identity of the cardholder. If the purchase qualifies for reward points, a reward point value is determined for the purchase. The reward point value for the purchased product or service may be determined based on a number of factors including, but not limited to, the identity of the product or service purchased, a purchase price of the product or service, the identity of the merchant, the identity of the cardholder, and the method of payment by the cardholder.

For example, if the cardholder pays via a credit account associated with the credit card, a higher reward point value may be assigned to the purchase as compared to when the cardholder uses a debit account associated with the credit card or a debit card to pay. The reward point value is converted to a credit amount by the processor 114 at the time of purchase. The credit amount is then automatically applied to the cardholder's account and stored in the database 112 without regard to a periodic time interval associated with the cardholder's account such as, for example, a multiple of the cardholder's billing cycle. In some embodiments, the credit amount is a cash value that is credited to the cardholder's credit card balance. In still other embodiments, the credit amount may be a quantity of reward point credits that can be applied to a future purchase or converted into a cash value at a later time.

The cardholder's bank server 108 then approves the purchase and sends an approval message to the card network server 106. In response, the card network server 106 sends an approval message to the merchant bank server 104. The merchant bank server 104 then sends an approval message to the merchant terminal 102. At the merchant terminal 102, the cardholder completes the purchase and receives a receipt. In accordance with some embodiments, the reward point and/or the credit amount can, for example, be presented to the cardholder by either being printed on the receipt or displayed at the merchant terminal 102.

Figure 2:
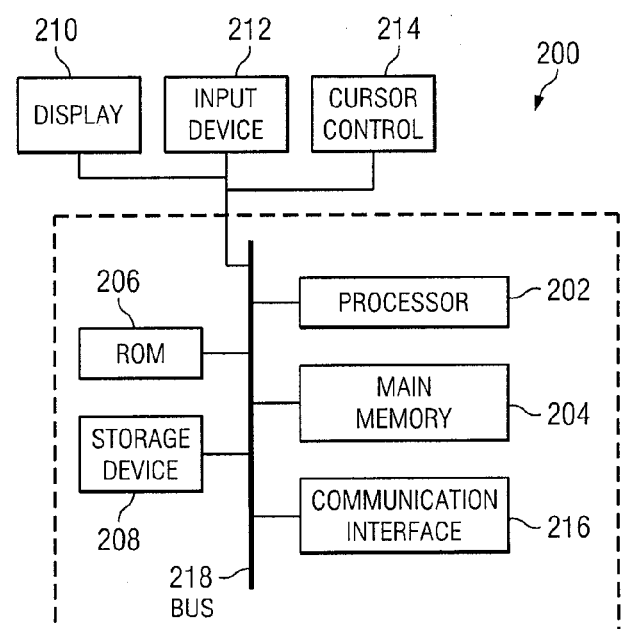
FIG. 2 illustrates an embodiment of a cardholder's bank server.

Referring now to FIG. 2, an embodiment of a cardholder's bank server is illustrated in more detail. In the implementation shown, a cardholder's bank server 200 may include a bus 218 or other communication mechanism for communicating information and a processor 202 coupled to the bus 218 for processing information. The cardholder's bank server 200 also includes a main memory 204, such as a random access memory (RAM) or other dynamic storage device, coupled to the bus 218 for storing computer readable instructions to be executed by the processor 202.

The main memory 204 also may be used for storing temporary variables or other intermediate information during execution of the instructions to be executed by the processor 202. The cardholder's bank server 200 further includes a read only memory (ROM) 206 or other static storage device coupled to the bus 218 for storing static information and instructions for the processor 202. A computer readable storage device 208, such as a magnetic disk or optical disk, is coupled to the bus 218 for storing information and instructions for the processor 202.

The cardholder's bank server 200 may be coupled via the bus 218 to a display 210, such as a cathode ray tube (CRT), for displaying information to a user. An input device 212, including, for example, alphanumeric and other keys, is coupled to the bus 218 for communicating information and command selections to the processor 202. Another type of user input device is a cursor control 214, such as a mouse, a trackball, or cursor direction keys for communicating direction information and command selections to the processor 202 and for controlling cursor movement on the display 210. The cursor control 214 typically has two degrees of freedom in two axes, a first axis (e.g., x) and a second axis (e.g., y), that allow the device to specify positions in a plane.

The term "computer readable instructions" as used above refers to any instructions that may be performed by the processor 202 and/or other component of the cardholder's bank server 200. Similarly, the term "computer readable medium" refers to any storage medium that may be used to store the computer readable instructions. Such a medium may take many forms, including, but not limited to, non volatile media, volatile media, and transmission media. Non volatile media include, for example, optical or magnetic disks, such as the storage device 208. Volatile media include dynamic memory, such as the main memory 204. Transmission media include coaxial cables, copper wire and fiber optics, including wires of the bus 218. Transmission can take the form of acoustic or light waves, such as those generated during radio frequency (RF) and infrared (IR) data communications. Common forms of computer readable media include, for example, a floppy disk, a flexible disk, hard disk, magnetic tape, and any other magnetic medium, a CD ROM, DVD, any other optical medium, punch cards, paper tape, any other physical medium with patterns of holes, a RAM, a PROM, an EPROM, a FLASH EPROM, and other memory chip or cartridge, a carrier wave, or any other medium from which a computer can read.

Various forms of the computer readable media may be involved in carrying one or more sequences of one or more instructions to the processor 202 for execution. For example, the instructions may initially be borne on a magnetic disk of a remote computer. The remote computer can load the instructions into its dynamic memory and send the instructions over a telephone line using a modem. A modem local to the cardholder's bank server 200 can receive the data on the telephone line and use an infrared transmitter to convert the data to an infrared signal. An infrared detector coupled to the bus 218 can receive the data carried in the infrared signal and place the data on the bus 218. The bus 218 carries the data to the main memory 204, from which the processor 202 retrieves and executes the instructions. The instructions received by the main memory 204 may optionally be stored on the storage device 208 either before or after execution by the processor 202.

The cardholder's bank server 200 may also include a communication interface 216 coupled to the bus 218. The communication interface 216 provides a two way data communication coupling between the cardholder's bank server 200 and a network, such as the card network of FIG. 1. For example, the communication interface 216 may be an integrated services digital network (ISDN) card or a modem used to provide a data communication connection to a corresponding type of telephone line. As another example, the communication interface 216 may be a local area network (LAN) card used to provide a data communication connection to a compatible LAN. Wireless links may also be implemented. In any such implementation, the communication interface 216 sends and receives electrical, electromagnetic, optical, or other signals that carry digital data streams representing various types of information.

The storage device 208 can further include instructions for carrying out various processes for automatically converting reward points to credits described herein when executed by the processor 202. The storage device 208 can further include a database for storing cardholder account information.

Referring now to FIG. 3, a flow diagram illustrating a process for automatically converting reward points to credits to an account is shown. A process flow 300 begins at step 302. From step 302, execution proceeds to step 304. At step 304, a cardholder's credit card is received at a merchant terminal. At the merchant terminal, the credit card is swiped, and the credit card number and details regarding the purchase are sent to the cardholder's bank. In various embodiments, the merchant terminal is connected to the cardholder's bank through a merchant bank server and card network server. In still other embodiments, the merchant terminal may be connect to the cardholder's bank, for example, through a private network, telephone line, or the Internet.

At step 306, a cardholder is identified by the cardholder's bank using the credit card number obtained from the credit card. At step 308, a determination is made regarding whether the cardholder is associated with the particular financial services company of which the cardholder's bank is a member. In accordance with some embodiments, the merchant is an affiliated merchant of the financial services company, while in other embodiments, this condition may not be required and step 308 can be omitted.

If it is determined at step 308 that the cardholder is associated with the particular financial services company, execution proceeds to step 310. If, at step 308, it is not determined that the cardholder is associated with the particular financial services company, execution proceeds to step 318. At step 318, the process 300 ends.

At step 310, a determination is made by the cardholder's bank regarding whether the purchase being made with the credit card qualifies for reward points. Criteria for determining whether a purchase qualifies for reward points may include, but are not limited to, the identity of the product or service purchased, a purchase price of the product or service, the identity of the merchant, and the identity of the cardholder. In some embodiments, step 310 can be omitted.

If, at step 310, it is not determined that the purchase qualifies for reward points, execution proceeds to step 318, at which step the process 300 ends. If it is determined at step 310 that the purchase qualifies for reward points, execution proceeds to step 312. At step 312, a reward point value is determined for the purchase. The reward point value for the purchased product or service may be determined based on a number of factors including, but not limited to, the identity of the product or service purchased, a purchase price of the product or service, the identity of the merchant, the identity of the cardholder, and the method of payment by the cardholder. For example, if the cardholder pays via a credit account associated with the credit card, a higher reward point value may be assigned to the purchase as compared to the cardholder using a debit account associated with the credit card to pay for the purchase.

From step 312, execution proceeds to step 314. At step 314, the reward point value is converted to a credit amount (e.g., in dollars and cents). In some embodiments, the credit amount is a cash value that is credited to the cardholder's credit card balance. In still other embodiments, the credit amount may be a quantity of reward point credits that can be applied to a future purchase or converted into a cash value at a later time. At step 316, the credit amount determined at step 314 is automatically applied to the cardholder's account substantially immediately upon purchase without regard to a periodic time interval associated with the cardholder's account, such as, for example, a multiple of the cardholder's billing cycle. The term substantially immediately means a time of less than two hours, or, in some embodiments, less than one hour, or less than thirty minutes, or less than ten minutes, or less than one minute. The term automatically means without requiring action by the cardholder or customer to redeem the reward points or the like. From step 316, execution proceeds to step 318, at which step the process 300 ends.

The processes described herein provide for a substantially immediate reward benefit to a cardholder during a credit or debit transaction such that there is no need to wait until the end of a month, quarter, or year to receive a cashback reward.

Additionally, in a typical embodiment, the process is automatically performed and transparent in that it does not require any overt action on the part of the cardholder in order to redeem the reward points.

In accordance with various embodiments, the merchant terminal may be provided with a display or keypad to prompt the cardholder upon swiping of a card to choose whether payment for the current purchase should be made by credit, debit, or from the cardholder's accumulated reward point credits. For example, the display or keypad can be provided with "Credit", "Debit" and "Reward" buttons for this purpose. Upon choosing of the "Reward" prompt by the cardholder, the cost of the current purchase is debited from the cardholder's reward points credit account. In short, rewards may be moved to the "front end" of methods and systems for providing rewards.

Various embodiments have been described in the context of a purchase made by a customer present at a merchant terminal; however, those having skill in the art will appreciate that purchases made by a customer who is remotely located from a merchant location and merchant terminal, such as those made via the Internet, are also contemplated herein.

The previous description is of embodiment(s) for implementing the methods and systems described herein, and the scope should not be limited by this description. The scope is instead defined by the following claims.

What is claimed is:

1. A method for applying a credit amount to a cardholder's account, the method comprising:
   upon receiving a swipe from a card, providing a prompt to a cardholder, via a display, to choose to make a purchase from a merchant using either the card or reward points;
   in response to receiving a request to use the card:
   receiving the card from the cardholder for the purchase from the merchant;
   sending a card number associated with the card to a cardholder's bank server;
   identifying, by the cardholder's bank server, the cardholder as being associated with a financial services company of which the cardholder's bank is a member;
      determining, by the cardholder's bank server, whether the purchase qualifies for the rewards points, based on an identity of a product or service purchased, a purchase price of the product or the service purchased, an identity of the merchant, and the identity of the cardholder;
      in response to a determination that the purchase does not qualify for the rewards points, completing the purchase without applying the rewards points;
      in response to a determination that the purchase does qualify for the rewards points:
      determining, by the cardholder's bank server, a reward point value available from the financial services company for using the card for the purchase, wherein a higher reward point value is applied when the cardholder elects to purchase with a credit card rather than a debit account associated with the card or a debit card;
      automatically converting at the time of the purchase, by the cardholder's bank server, the reward point value to a credit amount;
      automatically, without an action on the part of the cardholder to redeem the credit amount, applying the credit amount to the cardholder's account substantially immediately upon purchase without regard to a periodic time interval associated with the cardholder's card account to determine a new card balance for substantially immediate use by the cardholder; and
   presenting the new credit card balance to the cardholder; and
   in response to receiving a request to use the reward points, debiting a required number of the rewards points from a reward points credit account of the cardholder.

2. The method of claim 1, wherein the merchant is affiliated with the financial services company.

3. The method of claim 1, wherein:
   a merchant terminal for displaying the credit amount is remotely located relative to the cardholder.

4. The method of claim 1, wherein the reward point value is determined based upon at least one of the identity of the purchase, the price of the purchase, the identity of the merchant, and the identity of the cardholder.

5. The method of claim 1, wherein the credit amount comprises a cash value.

6. The method of claim 1 further comprising displaying the credit amount to the cardholder at a merchant terminal.

7. A system for applying a credit amount to a cardholder's account, the system comprising:
   a merchant terminal configured to provide, upon receiving a swipe from a card, a prompt to a cardholder to choose to make a purchase from a merchant using either the card or reward points;
   in response to receiving a request to use the card:
   the merchant terminal configured to receive the card from the cardholder for the purchase from the merchant; and
   a cardholder's bank server in communication with the merchant terminal, the cardholder's bank server configured to:
   receive a card number associated with the card from the merchant terminal;
   identify the cardholder as being associated with a financial services company of which the cardholder's bank is a member;
   determine whether the purchase qualifies for the rewards points based on an identity of a product or service purchased, a purchase price of the product or the service purchased, an identity of the merchant, and the identity of the cardholder;
   in response to a determination that the purchase does not qualify for the rewards points, completing the purchase without applying the rewards points;
   in response to a determination that the purchase does qualify for the rewards points:
   determine a reward point value available from the financial services company for using the card for the purchase, wherein a higher reward point value is applied when the cardholder elects to purchase with a credit card rather than a debit account associated with the card or a debit card;
   automatically convert the reward point value to a credit amount at the time of the purchase;
   automatically, without an action on the part of the cardholder to redeem the credit amount, apply the credit amount to the cardholder's account substantially immediately upon purchase without regard to a periodic time interval associated with the cardholder's card account to determine a new card balance, the new credit card balance for substantially immediate use by with the cardholder; and
   present the new credit card balance to the cardholder; and
   in response to receiving a request to use the reward points, the cardholder's bank server being configured to debit a required number of the rewards points from a reward points credit account of the cardholder.

8. The system of claim 7, wherein the merchant is affiliated with the financial services company.

9. The system of claim 7, wherein:
the merchant terminal is remotely located relative to the cardholder.

10. The method of claim 7, wherein the reward point value is determined based upon at least one of the identity of the purchase, the price of the purchase, the identity of the merchant, and the identity of the cardholder.

11. The system of claim 7, wherein the credit amount comprises a cash value.

12. The system of claim 7 wherein the merchant terminal is further configured to displaying the credit amount to the cardholder.

13. An article of manufacture for applying a credit amount to a cardholder's account, the article of manufacture comprising:
at least one non-transitory computer readable storage medium; and
processor instructions contained on the at least one non-transitory computer readable storage medium, the processor instructions configured to be readable from the at least one non-transitory computer readable storage medium by at least one processor and thereby cause the at least one processor to operate as to:
provide, upon receiving a swipe from a card, a prompt to a cardholder, via a merchant terminal, to choose to make a purchase from a merchant using either the card or reward points;
in response to receiving a request to use the card:
receive a card number associated with the card from the merchant terminal, wherein the card is received at the merchant terminal from the cardholder for the purchase from the merchant;
identify the cardholder as being associated with a financial services company of which the cardholder's bank is a member;
determine whether the purchase qualifies for the rewards points, based on the an identity of a product or service purchased, a purchase price of the product or the service purchased, an identity of the merchant, and the identity of the cardholder;
in response to a determination that the purchase does not qualify for the rewards points, completing the purchase without applying the rewards points;
in response to a determination that the purchase does qualify for the rewards points:
determine a reward point value available from the financial services company for using the card for the purchase, wherein a higher reward point value is applied when the cardholder elects to purchase with a credit card rather than a debit account associated with the card or a debit card;
automatically convert the reward point value to a credit amount at the time of the purchase;
automatically, without an action on the part of the cardholder to redeem the credit amount, apply the credit amount to the cardholder's account substantially immediately upon purchase without regard to a periodic time interval associated with the cardholder's card account to determine a new card balance for substantially immediate use by the cardholder; and
present the new credit card balance to the cardholder; and
in response to receiving a request to use the reward points, the processor caused to operate to debit a required number of the rewards points from a reward points credit account of the cardholder.

14. The article of manufacture of claim 13, wherein the merchant is a merchant affiliated with the financial services company.

15. The article of manufacture of claim 13, wherein:
the merchant terminal is remotely located relative to the cardholder.

16. The article of manufacture of claim 13, wherein the reward point value is determined based upon at least one of the identity of the purchase, the price of the purchase, the identity of the merchant, and the identity of the cardholder.

17. The article of manufacture of claim 13, wherein the credit amount comprises a cash value.

18. The article of manufacture of claim 13, the processor instructions further configured to cause the at least one processor to operate as to cause the merchant terminal to display the credit amount to the cardholder.

* * * * *

UNITED STATES PATENT AND TRADEMARK OFFICE
CERTIFICATE OF CORRECTION

| | |
|---|---|
| PATENT NO. | : 8,695,875 B1 |
| APPLICATION NO. | : 11/466419 |
| DATED | : April 15, 2014 |
| INVENTOR(S) | : Michele Lea Segura |

It is certified that error appears in the above-identified patent and that said Letters Patent is hereby corrected as shown below:

In the Claims

Column 8, Line 6, In Claim 2, after "merchant is" insert -- a merchant --

Column 9, Line 1, In Claim 8, after "merchant is" insert -- a merchant --

Column 9, Line 39, In Claim 13, after "based on" delete "the"

Signed and Sealed this
Twenty-fifth Day of November, 2014

Michelle K. Lee
*Deputy Director of the United States Patent and Trademark Office*